Dec. 29, 1964  V. F. ZAHODIAKIN  3,163,198
STUD RECEPTACLE ASSEMBLY
Filed July 30, 1962

INVENTOR.
VICTOR F. ZAHODIAKIN
BY John N. Bain
ATTORNEY.

United States Patent Office 3,163,198
Patented Dec. 29, 1964

3,163,198
STUD RECEPTACLE ASSEMBLY
Victor F. Zahodiakin, River Road, Summit, N.J.
Filed July 30, 1962, Ser. No. 213,319
5 Claims. (Cl. 151—41.75)

My invention relates generally to fasteners and specifically to a stud receptacle assembly adapted for positive yet detachable mounting on panels by means of a resilient member and is a continuation in part of my co-pending U.S. patent application, Ser. No. 191,556, filed May 1, 1962.

There are many uses for fasteners having a stud threadably engaged to an opposing stud receptacle. Such fasteners are particularly useful for securing a pair of flat elements together as for instance, structural panels and the like in aircraft. However, these fasteners are not limited to the aircraft industry alone but have many other analogous uses in unrelated arts.

In general, the fasteners comprise a stud or a stud and grommet assembly mounted in a transverse bore in a removable panel and adapted to cooperatively and threadably engage a female stud receptacle mounted over a corresponding bore in a structural member. It is desirable to provide means for quickly and easily mounting the stud receptacle to the structural member and yet provide means for quickly and easily removing the same should it become damaged. In the past, the receptacle has been mounted on the structural member in a substantially permanent manner by a pair of rivets passing through legs formed integrally with the receptacle assembly. Obviously, such a mounting is commercially undesirable since, if the receptacle is damaged, the rivets must be drilled out or otherwise cut and a new receptacle riveted in place resulting in prohibitive costs for both installation and re-installation. In my co-pending U.S. patent application, aforementioned, I disclose a stud receptacle which is positively yet detachably secured to a member by means of a resilient clip. This assembly is entirely satisfactory for many purposes. However, when the working space in and about the stud receptacle assembly is limited, installation becomes more difficult. Specifically, substantial pressure must be applied to the stud receptacle assembly to force it downwardly toward the structural member while simultaneously, pressure must be applied on the clip from the opposite side of the structural member to expand a plurality of upstanding resilient legs on the clip which are adapted to engage and seat within grooves in a peripheral flange on the receptacle. When the working space in and about the receptacle assembly is limited, it will be difficult and awkward to apply the necessary downward force to the receptacle to expand the resilient member.

Therefore, it is among the objects and advantages of my invention to provide a stud receptacle assembly which may be detachably yet positively mounted on a structural member or body by means of rotary motion.

Another object of my invention is to provide a stud receptacle assembly in which the stud receptacle is detachably yet positively mounted on a structural member by means of its cooperative engagement with an opposing, resiliently deformable member.

Still a further object of my invention is to provide a stud receptacle assembly which may be floatably mounted on a structural member to provide sufficient lateral movement for alignment with an opposed, cooperative stud and grommet assembly mounted in a bore in an opposing panel.

Yet a further object of my invention is to provide a stud receptacle assembly in which rotary motion of the receptacle, employed to generate expansion of a resilient cooperative clip adapted to secure the assembly to the structural member may be induced by rotation of a stud which is threadably engaged with the receptacle.

Another object of my invention is to provide a stud receptacle assembly which may be quickly and easily detached from the member by means of a simple, tool adapted to expand the resilient member securing the receptacle to the structural member.

Still a further object of my invention is to provide a stud receptacle assembly having a plurality of radial cam surfaces adapted to engage and operatively expand a resilient member as the receptacle is rotated until the resilient member engages and seats within a plurality of peripheral grooves in the cam surfaces.

Still a further object of my invention is to provide a stud receptacle assembly in which the assembly is non-rotatable when the resilient member is seated within the peripheral grooves in the receptacle, to allow normal operation of the stud.

These objects and advantages as well as other objects and advantages may be achieved by my invention, one embodiment of which is illustrated in the drawings in which.

Figure 1:
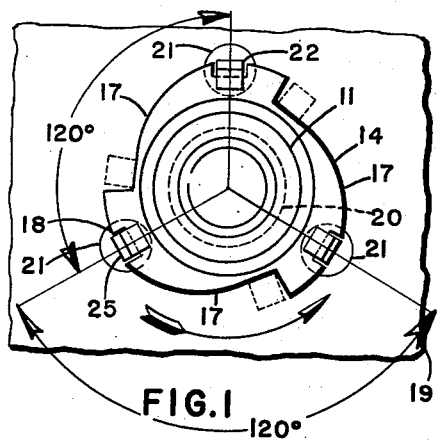
FIGURE 1 is a top plan view of my stud receptacle assembly mounted on a structural member.
Figure 4:
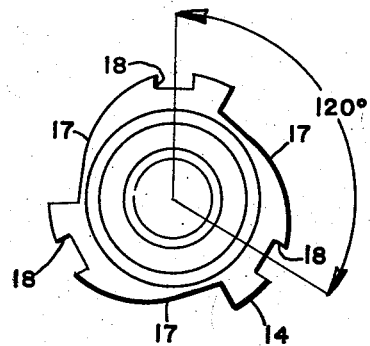
FIGURE 4 is a top plan view of the stud receptacle employed in my assembly.
Figure 2:
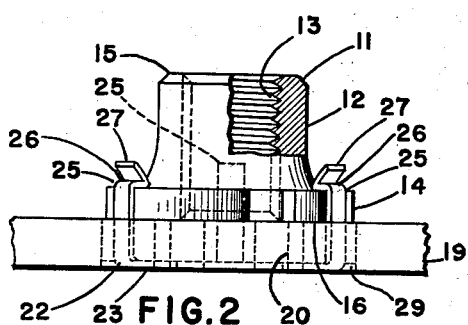
FIGURE 2 is a side elevational, partially cut away view of the stud receptacle assembly shown in FIGURE 1.
Figure 5:
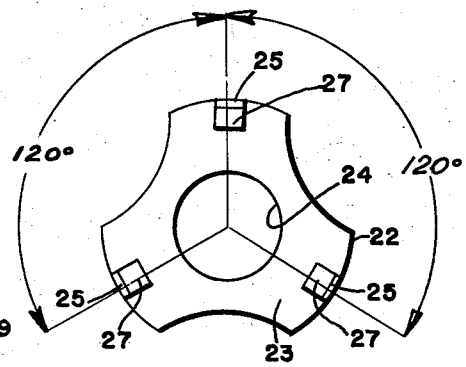
FIGURE 5 is a top plan view of a resilient clip adapted to cooperatively engage the stud receptacle shown in FIGURE 4 to positively yet detachably secure it to a structural member.
Figure 3:
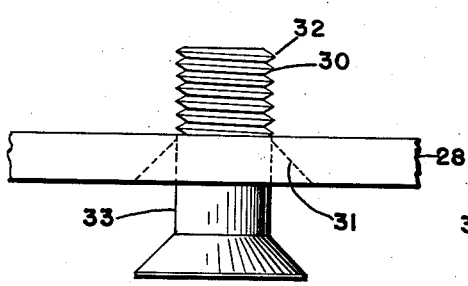
FIGURE 3 is a side elevational view of a stud mounted in a passage in a panel and adapted for engagement with my stud receptacle.

Referring now to the drawings in detail, my assembly comprises a stud receptacle 11 having a generally cylindrical body portion 12. The receptacle 11 is provided with a threaded, transverse bore 13 generally coaxial with the body portion 12. The bottom of the body portion 12 is provided with an integral radial flange 14. The top face 15 and bottom face 16 of the receptacle 11 are flat and generally parallel to each other.

The radial flange 14 is cut to define three cam surfaces 17 having vertical faces generally parallel to the axis of the bore 13 in the receptacle 11. Each of the cam surfaces 17 is the generation of a progressively increasing radius from the axis of the bore 13. A generally vertical, U-shaped groove 18 is provided in the face of each of the cam surfaces 17 in the proximity of the end of the cam surface having the greatest radius. For convenience, each of the cam surfaces 17 is of equal size and the grooves 18 are displaced from each other by 120°, as is shown in the drawings.

The receptacle 11 is adapted for mounting on a structural member 19 having a bore 20 generally coaxial with the bore 13 in the receptacle 11. The structural member 19 is also provided with three smaller, transverse bores 21, 21 and 21, the axis of each of which are parallel to the axis of the bore 20 in the structural member 19 and radially displaced therefrom at equal distances and displaced from each other by an angle of 120°.

The receptacle 11 is detachably yet positively mounted on the structural member 19 by a resilient clip 22. The clip 22 comprises a generally flat base 23 having a hole 24 therethrough. Formed integrally with the periphery of the base 23 are three, resilient, upstanding legs 25, 25, 25. The legs 25 are displaced from each other by 120° as shown and are positioned at equal distances from the axis of the hole 24. Each of the legs 25 is provided at its top with a radially and inwardly disposed integral, horizontal retaining leg 26. Formed integrally on the inward end of each retaining leg 26 is an upwardly and outwardly flaring cam leg 27.

In operation, the resilient clip 22 is mounted on the face of structural member 19 facing an opposed panel 28 to which member 19 is to be secured. For convenience, the member 19 may be provided with a recess 29 to accommodate the base 23 of the clip 22 so that the surface of the member 19 and the bottom of the base 23 lie in the same plane. The upstanding legs 25 extend upwardly and transversely through bores 21 in the member 19. The receptacle 11 is then positioned on the member 19 with its bottom face 16 flush with the face of the member opposite the recess 29, with the upstanding legs 25 of the clip 22 adjacent to the lowest portions of the respective cam surfaces 17 as shown in dotted lines in FIGURE 1. The threaded stud 30 which in use is adapted to pass through a countersunk bore 31 in the panel 28, is inserted directly through the bore 20 in member 19 without first being mounted in the panel 28, until its threads 32 engage the threaded bore 13 in the receptacle 11. The stud 30 is then rotated until its unthreaded shank 33 engages the threaded bore 13. Further, rotation of the stud 30 causes the entire receptacle 11 to rotate therewith. The resilient legs 25 engage and ride the cam surfaces 17 expanding radially outwardly as the receptacle 11 rotates. When the receptacle 11 has been rotated somewhat less than 120°, the legs 25 will resiliently seat within the respective grooves 18 in the cam surfaces 17. The height of each upstanding leg 25 is dimensioned so that its horizontal retaining leg 26 extends freely over the top most surface of the flange 14, positively retaining the receptacle 11 against disengagement from the member 19. In addition, since the upstanding legs 25 are resiliently seated within the grooves 18 in the cam surfaces 17, the receptacle 11 is secured against rotational movement. The stud 30 may then be withdrawn from the threaded bore 13 of receptacle 11, mounted in the bore 31 in opposing panel 28 and thereafter again tightly screwed into threaded bore 13 to fasten panel 28 to member 19.

It should be noted that the diameter of the bores 21 is slightly greater than the width of the upstanding legs 25. In addition, the width of the grooves 18 is slightly greater than the width of the upstanding legs 25. Thus, the receptacle 11 is able to float while remaining positively yet detachably engaged to the member 19. This floating action which provides lateral movement as well as rotational movement permits alignment of the threaded bore 13 with stud 30 passing through counter-sunk bore 31 in the panel 28.

Figure 6:
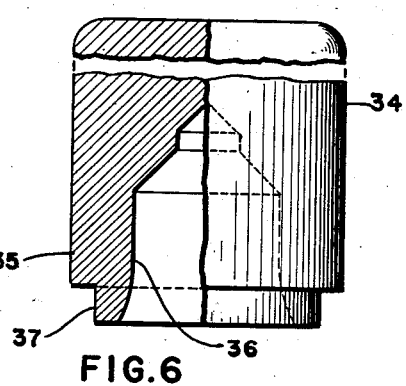
FIGURE 6 is a side elevational partially cut away view of a tool adapted to engage the resilient clip shown in FIGURE 5 to expand and detach the stud receptacle shown in FIGURE 4 therefrom.

A simple tool 34, shown in FIGURE 6, is provided to remove the receptacle 11 from member 19. The tool 34 comprises a generally cylindrical body 35 having a coaxial blind bore 36 therein communicating with its bottom face. The body portion 35 is undercut to define a generally annular flange 37 surrounding the open end of bore 36. The bore 36 is outwardly flared at its bottom end to closely conform to the shape of the body portion 12 of receptacle 11. Of course, the depth of the bore 36 is great enough to accommodate the entire receptacle 11. In operation, the tool 34 is fitted over the receptacle 11. The annular flange 37 engages the cam leg 27 on each of the upstanding legs 25 of the clip 22. Slight downward pressure against the tool 34 causes the annular flange 37 to expand the upstanding legs 25 radially outwardly due to the camming action of the cam legs 27 and flange 37. When flange 37 engages the member 19, the horizontal legs 26 disengage the flange 14 on receptacle 11. If the tool 34 is then slightly cocked at an angle to the member 19, the receptacle 11 will gently lift from the clip 22 to disengage member 19. In this manner, receptacle 11 can be positively secured to member 19 without the necessity of applying substantial downward pressure to the receptacle 11 to engage it to the spring clip 22. Yet at the same time, the receptacle can be quickly and easily detached from the member 19 by means of the simple and inexpensive tool 34.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:
1. A stud receptacle assembly comprising
   (a) a stud receptacle mounted on one side of a structural member, both the receptacle and the structural member each having a transverse bore with the bores communicating with each other;
   (b) a radial flange on the receptacle, the flange having a flat top surface lying in a plane generally perpendicular to the axis of the fore in the receptacle;
   (c) the outer circumference of said flange comprising a plurality of radial cam surfaces spaced equally about the flange, each said cam surface having a predetermined progressive divergence circumferentially of the flange from minimum to maximum displacement from the axis;
   (d) a retainer clip including resiliently deformable upstanding legs mounted on the opposite side of the structural member from said receptacle and extending transversely thereof each through a different one of a plurality of second bores in said member and into resilient contact with a proximate cam surface thereat, each said second bore terminating at its end proximate to the cam surface at and transverse to the path of sweep of the diverging cam surface progressively across each said second bore as the cam surface rotates, each said second bore having a location and size accommodating radial flexing of the respective said upstanding leg throughout the path of sweep of said proximate cam surface across each said second bore;
   (e) the resiliently deformable upstanding leg adapted to slidably and resiliently engage and follow the cam surface upon rotation of the receptacle and flange;
   (f) a radial offset on the resiliently deformable legs generally parallel to the plane of the top surface of the flange and adapted to engage the same flatwise, thereby securing the receptacle against disengagement from the structural member; and
   (g) said flange having grooves parallel to the receptacle axis interrupting the progressive circumferential divergence of each cam surface substantially at a position of maximum radial displacement from the axis of said cam surface, said grooves being simultaneously receptive of the respective upstanding legs as the flange is rotated and the cam surfaces all attain and pass position of maximum predetermined divergence in their contact with said legs.

2. A stud receptacle assembly comprising,
   (a) the structure in accordance with claim 1 in which
   (b) said groove has its bottom at a distance radially from the axis greater than aforesaid minimum displacement of the cam surface from the axis and at a position less than the said maximum displacement of the cam surface from the axis, thereby providing for flexing the legs with resilient tensioning thereof on approach to said grooves to snap thereinto upon registration therewith and to be retained under tension in said grooves against the bottoms thereof, said grooves having radial sides interengaging with said legs in both directions of attempted rotation of the receptacle and flange thereby locking the flange from rotation in either direction.

3. A stud receptacle assembly comprising,
(a) a stud receptacle mounted on one side of a structural member, both the receptacle and structural member each having a transverse bore with the bores communicating with each other and said receptacle bore being screw-threaded;
(b) a radial flange on the receptacle;
(c) the outer circumference of said flange comprising a plurality of radial cam surfaces spaced equally about said flange;
(d) a retainer clip including resiliently deformable upstanding legs mounted on the opposite side of the structural member, said legs extending transversely through second bores in the structural member;
(e) the resiliently deformable legs adapted to slidably and resiliently engage and follow the cam surfaces upon rotation of the receptacle, and
(f) a plurality of radial offsets on the resiliently deformable legs generally parallel to the plane of the top surface of the flange and adapted to engage the top surface of the flange thereby positively securing the receptacle against disengagement from the structural member, and
(g) longitudinal grooves positioned near the radially outermost portion of the cam surfaces adapted to engage the resiliently deformable legs upon rotation of the receptacle thereby securing the receptacle against rotation.

4. A stud receptacle assembly comprising,
(a) a stud receptacle mounted on one side of a structural member, both the receptacle and the structural member each having a transverse bore with the bores communicating with each other;
(b) a radial flange at the bottom end of said receptacle juxtaposed on said structural member, the flange having a generally flat top surface lying in a plane parallel to the bottom of said flange and generally perpendicular to the axis of the bore in the receptacle;
(c) the outer circumference of said flange comprising a plurality of radial cam surfaces of equal circumferential length equally spaced about the flange, said cam surfaces sequentially conforming one to another and having equal predetermined progressive divergence circumferentially of the flange from minimum to maximum displacement from the axis;
(d) a retainer clip including resiliently deformable upstanding legs mounted on the opposite side of the structural member from said receptacle and each extending transversely thereof through said member, said legs being proximate to respective cam surfaces and resiliently deflectable simultaneously equal amounts by rotation of the receptacle, said legs in engagement with said cam surfaces retaining the receptacle substantially coaxial to the first said bore of the structural member with said legs slidable and resiliently engaging and following the cam surfaces upon rotation of the receptacle and flange;
(e) a radial offset on each resiliently deformable leg generally parallel to and in the plane of the top surface of the flange and adapted to engage the same flatwise, the cam surfaces effecting like amounts of engagement of the offsets on the flange top surface, thereby securing the receptacle against disengagement in an axial direction from said structural member; and
(f) means on each cam surface proximate to the outermost portion of each cam surface adapted to engage both sides of the respective upstanding leg thereat upon rotation of the receptacle to final position thereby securing the receptacle against rotation in either direction.

5. A stud receptacle assembly comprising,
(a) the structure in accordance with claim 4 in which
(b) said means on each cam surface provided for each respective upstanding leg, comprising a groove having sides parallel to the receptacle axis, each of said grooves having a width at least as great as the width of the respective leg thereat and adapted to receive the resiliently actuated leg between said sides of the groove thereby securing the receptacle against rotation in either direction.

References Cited by the Examiner
UNITED STATES PATENTS

| 1,269,059 | 6/18 | D'Arden | 151—47 |
| 2,276,694 | 3/42 | Henry | 24—221.2 |
| 2,303,148 | 11/42 | Tinnerman | 151—41.75 |
| 2,330,372 | 9/43 | Mittendorf | 151—41.75 |

EDWARD C. ALLEN, *Primary Examiner.*